Patented Nov. 24, 1942

2,302,762

UNITED STATES PATENT OFFICE 2,302,762

ISOTHIOUREAS AND PROCESS FOR MAKING THEM

Charles Graenacher, Riehen, Richard Sallmann, Bottmingen, and Otto Albrecht, Basel, Switzerland, assignors to the firm of Society of Chemical Industry in Basle, Basel, Switzerland No Drawing. Application January 19, 1939, Serial No. 251,849. In Switzerland January 22, 1938

17 Claims. (Cl. 260—481).

According to the present invention new condensation products are obtained by reacting a thiourea compound containing the group

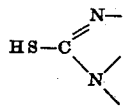

with a formaldehyde derivative of a compound of the general formula

R—CH$_2$—X—H wherein R stands for an organic radical containing at least 13 carbon atoms and X stands for a bridge consisting of an element of the fifth and sixth group of the periodic system of the elements, the atomic weight of which amounts to at the most 32 and is practically an even number.

As thiourea compound containing the group

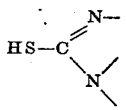

may be used thiourea, N-methyl-, N:N'-dimethyl-, N:N:N'-trimethylthiourea, N-monoethylthiourea, N-phenylthiourea, N:N'-diethylthiourea, potassium N-phenylthiourea-para-sulfonate, N-ethyl-N'-hydroxyethylthiourea, monothiobiuret (NH$_2$—CO—NH—CS—NH$_2$), thio-allophanic acid methyl ester

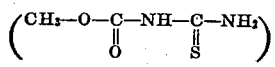

or the like.

Quite generally may be used thiourea compounds of the formula

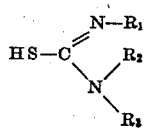

wherein R$_1$, R$_2$ and R$_3$ represent alkyl, aryl, aralkyl radicals, which radicals comprise substituted alkyl radicals or alkyl radicals interrupted by other atoms such as O, S, N, or substituted aryl radicals. These products of the indicated formula

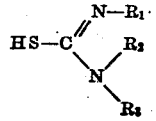

are also designated as "pseudo-thioureas." A radical such as

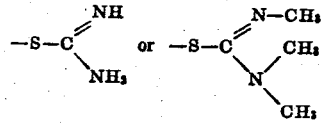

is therefore designated in the present specification as "a radical of a pseudo-thiourea compound."

In the above mentioned general formula

R—CH$_2$—X—H wherein R stands for an organic radical containing at least 13 carbon atoms, X represents a bridge consisting of an element of the fifth and sixth group of the periodic system of the elements, the atomic weight of which amounts to at most 32 and is practically an even number, and can therefore be formed from

—O— or —S—. As is known, nitrogen belongs to the fifth group of the periodic system of the elements, whereas oxygen and sulfur belong to the sixth group. As compounds of the above mentioned general formula

R—CH$_2$—X—H there come therefore into consideration amines, alcohols and mercaptans.

In the cited formula

R—CH$_2$—X—H

R represents quite generally an organic radical containing at least 13 carbon atoms. R may be for example a hydrocarbon radical belonging to the aliphatic, cycloaliphatic, mixed aliphatic-cycloaliphatic, aromatic, mixed aliphatic-aromatic or heterocyclic series. In contradistinction to aromatic hydrocarbons, aliphatic and cycloaliphatic hydrocarbon radicals contain generally no conjugated double bonds and can therefore be designated as being free from conjugated double bonds. The carbon chain of the radical R may also be interrupted once or repeatedly by heteroatoms, such as O, S, N, or by groups, such as

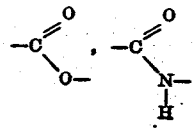

In the following are cited numerous examples of compounds of the general formula

R—CH₂—X—H which illustrate further the significance of R.

Formaldehyde derivatives of compounds of the above cited general formula

R—CH₂—X—H include the methylol compounds of the amines and the halogen methylethers of the alcohols and mercaptans.

As methylol compounds of amines there are especially suitable those of secondary amines, for instance hexadecylmethylamine, octadecylethylamine.

The α-halogenmethyl ethers applicable in the invention may be derived from aliphatic, cycloaliphatic or aliphatic-aromatic alcohols or phenols which contain at least 14 carbon atoms, for instance tetradecyl alcohol, cetyl alcohol, octadecyl alcohol or oleyl alcohol, also from polyhydric alcohols which contain radicals of high molecular weight in ether-like or ester-like union, for instance glycerol ethers. Also from alkanolamines and similar oxy-compounds acetylated at the nitrogen atom by a fatty acid radical of high molecular weight. Such α-halogenmethyl ethers, for instance the α-chloromethyl ethers may be made from the aforesaid oxy-compounds and equimolecular proportions of paraformaldehyde by introduction of hydrogen chloride in the usual manner, preferably at a low temperature, and if desired in presence of a solvent, such as benzene.

As α-halogenmethyl thioethers there may be used those α-halogenmethylsulfides which may be obtained easily in known manner from mercaptans, for instance tetradecyl or octadecyl mercaptan, thioglycollic acid octadecyl ester by means of formaldehyde and hydrogen halide.

The reaction between the formaldehyde derivatives of the compounds of the cited general formula

R—CH₂—X—H and the thiourea compounds containing the group

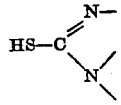

may be brought about by mixing the components at room temperature or at a raised temperature, for example 50–100° C., preferably in presence of a solvent, such as benzene, chloroform, carbon tetrachloride, or glacial acetic acid. In case the methylol compounds like methylol compounds of secondary amines are used, it is frequently preferable to employ a strong acid, for instance hydrogen chloride, as a condensing agent, and if desired a diluent, for instance alcohol.

According to the present process there are generally obtained salts of products of the general formula

R—CH₂—X—CH₂—R₁ wherein R stands for an organic radical containing at least 13 carbon atoms, X stands for a bridge consisting of an element of the fifth and sixth group of the periodic system of the elements, the atomic weight of which amounts to at most 32 and is practically an even number, and wherein R₁ represents the radical of a pseudo-thiourea compound, the sulfur atom of which is bound to the CH₂-group. As salts there come into consideration particularly the salts formed with mineral acids, such as hydrohalic acids, for instance hydrochloric acid, hydrobromic acid, sulfuric acid, further the salts formed with organic acids, such as formic acid, acetic acid. An example of such a salt is the product of the formula

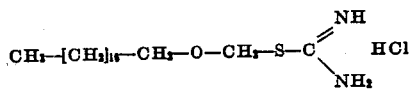

wherein the acid is bound by the pseudo-thiourea radical.

The condensation products obtainable by the invention when in the form of salts which they form with acids are soluble in water. The stability of the solutions thus obtained may be enhanced by certain additions, for example by addition of a thiourea, a urea, a capillary active product containing an active cation, for instance the acetate of oleylated unsymmetrical diethylenediamine or the μ-heptadecyl-N-methyl-N'-ethylbenzimidazolium chloride.

The products of the invention may be used among other purposes as assistants, for instance in the textile, leather and paper industries, for example as wetting, emulsifying, foam-producing, equalizing, softening agents, or as agents enhancing the fastness of dyeings to water; also as disinfectants or preservatives.

Their especial interest lies in their property of affording water-soluble salts which may be decomposed by heat, especially when heating the aqueous solution, or treatment with a saponifying agent, such as an alkali, for instance sodium hydroxide, whereby insoluble bodies may be caused to separate. When this decomposition occurs on a substratum, for instance a textile, this insoluble body adheres firmly to the substratum. It may, according to its nature, impart to the fiber certain valuable properties. Among these are predominant the waterproofing or water repelling property fast to washing with which, if desired, an especial softness and fullness may be connected, which latter properties may be enhanced by addition of separate filling agents. There may also be obtained a strong diminution of hygroscopic quality and an increase in thermal and electrical insulating properties. As further properties which may be imparted to the fiber may be named stability to creasing and to the shifting of the warp and weft, the diminution of lustre, the increase in fastness to water, the diminution of shrinkage of the fabric, and, in the case of wool, the diminution of the felting capacity. By local application of the process calendering, matting and damask effects and color effects which have their origin in the changed affinity of the fiber for dyestuffs may be attained. When the process is applied to colored textiles, the properties of the colors, for instance fastness to light, to rubbing, to washing and to water, are essentially enhanced. These different effects may be additive.

If the parent materials used for the condensation are dyestuffs or intermediate products for dyestuffs, it is possible to bring the new products on to the fiber and to subject them to decomposition thereon, whereby the dyestuff or the intermediate product is fixed on the fiber and in the case of the intermediate product may be developed thereon.

The products of the invention may be used alone or together with other materials, for instance salts, especially salts of weak acids, for instance sodium acetate, ammonium acetate, aluminium formate, aluminium acetate, or together with solvents or hydrocarbons, such as paraffin wax or with products enhancing solubility, for instance urea, thiourea, ammonium sulfocyanide, also together with soaps, soap-like substances, protective colloids, dressing agents, such as methylol urea, loading agents, softening agents or matting agents.

The following examples illustrate the invention, the parts being by weight:

Example 1

58 parts of cetyl chloromethyl ether are dissolved in 178 parts of benzene and the solution is mixed with 16 parts of finely powdered thiourea and heated with energetic stirring at 75° C. After one hour, the stirring is interrupted and after cooling the precipitated product is filtered, washed with benzene and dried in a vacuum. Yield 93 per cent.

The new product of the formula

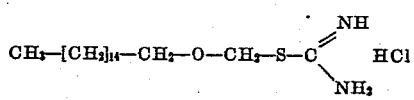

forms white crystalline laminae which dissolve in warm water to form a strongly foaming solution.

The cetyl bromomethyl ether can be caused to react with thiourea in similar manner. Further, the cetyl chloromethyl ether can be condensed with N:N'-diethyl-thiourea instead of with thiourea. Moreover, in the cited reactions the cetyl chloromethyl ether can be replaced by the tetra-decyl-chloromethyl ether.

Example 2

A commercial mixture consisting chiefly of octadecyl alcohol and a small proportion of hexadecyl alcohol is converted in the usual manner into the α-chloromethyl ether. 25 parts of the α-chloromethyl ether thus obtained (boiling point 183–188° C. under a pressure of 3 mm. mercury gauge) are dissolved in 77 parts of dry benzene, 6.4 parts of finely powdered thiourea are added while rapidly stirring and the whole is heated for about one hour at 75° C., care being taken to mix well. After cooling the precipitated condensation product which probably has the formula

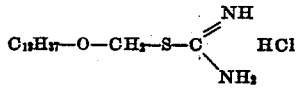

or

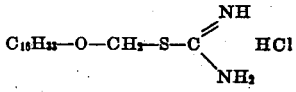

is removed from the liquor, washed with benzene and freed at a low temperature from the adhering solvent. There is obtained a colorless powder which is dissolved by hot water to a solution which foams strongly when shaken. This new condensation product is especially suitable for rendering textiles water-repellent. A hydrophobe character fast to washing is obtained already if the fabric, for instance of cotton impregnated with the aqueous solution is dried at 75° C.

Example 3

Thioglycollic acid is esterified by means of the commercial mixture consisting chiefly or octadecyl alcohol and a small proportion of hexadecyl alcohol by heating equivalent quantities of the components in presence of a little concentrated sulfuric acid and in a stream of nitrogen at about 115–120° C. until approximately the calculated quantity of water has distilled. From this ester the corresponding α-chloromethyl thioether is prepared in known manner; for example 20 parts of the thioglycollic ester are dissolved in 40 parts by volume of benzene and after addition of 1.7 parts of paraformaldehyde the solution is saturated with hydrogen chloride at 5–10° C., the water is separated and the solvent distilled under diminished pressure.

10 parts of the α-chloromethyl thioether thus obtained are dissolved in 30 parts by volume of dry benzene; the solution is mixed with 2.1 parts of finely powdered thiourea and heated in the course of an hour while rapidly stirring to 75° C. After cooling the condensation product which has separated is removed from the liquor, washed with benzene and freed at a low temperature from adhering solvent. There is obtained a colorless powder which is dissolved by hot water to a solution that foams when shaken and is probably a mixture of

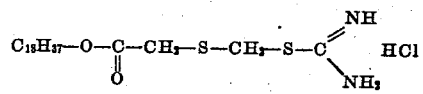

and

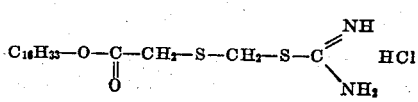

The corresponding bromomethyl thioether of the above cited thioglycollic acid ester may be caused to react with thiourea in similar manner. Further, the described S-chloromethyl thioglycollic acid ester can be condensed with N:N'-diethylthiourea instead of with thiourea. Moreover, the S-chloromethylthioether of the thioglycollic acid cetylester or of the thioglycollic acid-para-dodecyl-phenolester may be caused to react with thiourea in similar manner.

What we claim is:

1. A process for the manufacture of condensation products, which comprises reacting a thiourea compound of the formula

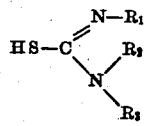

wherein $R_1$, $R_2$ and $R_3$ are members of the group consisting of hydrogen and alkyl radicals, with a formaldehyde derivative of a compound of the formula

R—CH$_2$—X—H wherein R—CH$_2$— stands for a member of the group consisting of alkyl radicals containing at least 16 carbon atoms and alkyl radicals containing at least 16 carbon atoms and having the carbon chain thereof interrupted by an

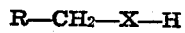

group, the carbon atom of the latter adhering to the —CH$_2$— group of the said R—CH$_2$—, and X stands for a member of the group consisting of oxygen and sulfur.

2. A process for the manufacture of condensation products, which comprises reacting a thiourea compound of the formula

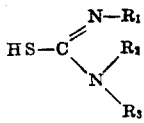

wherein $R_1$, $R_2$ and $R_3$ are members of the group consisting of hydrogen and alkyl radicals, with a formaldehyde derivative of a compound of the formula $$R-CH_2-O-H$$

wherein $R-CH_2-$ stands for a member of the group consisting of alkyl radicals containing at least 16 carbon atoms and alkyl radicals containing at least 16 carbon atoms and having the carbon chain thereof interrupted by an

group, the carbon atom of the latter adhering to the $-CH_2-$ group of the said $R-CH_2-$.

3. A process for the manufacture of condensation products, which comprises reacting a thiourea compound of the formula

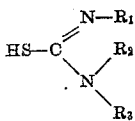

wherein $R_1$, $R_2$ and $R_3$ are members of the group consisting of hydrogen and alkyl radicals, with a formaldehyde derivative of a compound of the formula $$R-CH_2-S-H$$

wherein $R-CH_2-$ stands for a member of the group consisting of alkyl radicals containing at least 16 carbon atoms and alkyl radicals containing at least 16 carbon atoms and having the carbon chain thereof interrupted by an

group, the carbon atom of the latter adhering to the $-CH_2-$ group of the said $R-CH_2-$.

4. A process for the manufacture of condensation products, which comprises reacting a thiourea compound of the formula

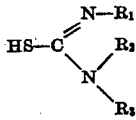

wherein $R_1$, $R_2$ and $R_3$ are members of the group consisting of hydrogen and alkyl radicals, with a formaldehyde derivative of the formula $$R-CH_2-O-CH_2-Cl$$

wherein $R-CH_2-$ stands for a member of the group consisting of alkyl radicals containing at least 16 carbon atoms and alkyl radicals containing at least 16 carbon atoms and having the carbon chain thereof interrupted by an

group, the carbon atom of the latter adhering to the $-CH_2-$ group of the said $R-CH_2-$.

5. A process for the manufacture of condensation products which comprises reacting a thiourea compound of the formula

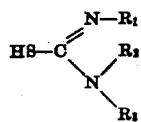

wherein $R_1$, $R_2$ and $R_3$ are members of the group consisting of hydrogen and alkyl radicals, with a formaldehyde derivative of the formula $$R-CH_2-S-CH_2-Cl$$

wherein $R-CH_2-$ stands for a member of the group consisting of alkyl radicals containing at least 16 carbon atoms and alkyl radicals containing at least 16 carbon atoms and having the carbon chain thereof interrupted by an

group, the carbon atom of the latter adhering to the $-CH_2-$ group of the said $R-CH_2-$.

6. A process for the manufacture of condensation products, which comprises reacting thiourea with a formaldehyde derivative of the formula $$R-CH_2-O-CH_2-Cl$$

wherein R stands for an aliphatic radical containing at least 15 carbon atoms, in presence of a diluent.

7. A process for the manufacture of condensation products, which comprises reacting thiourea with the formaldehyde derivative of the formula $$CH_3-(CH_2)_{16}-CH_2-O-CH_2-Cl$$

in the presence of a diluent.

8. A process for the manufacture of condensation products, which comprises reacting thiourea with the formaldehyde derivative of the formula $$CH_3-(CH_2)_{16}-CH_2-O-C(=O)-CH_2-S-CH_2-Cl$$

in the presence of a diluent.

9. A process for the manufacture of condensation products, which comprises reacting thiourea with the formaldehyde derivative of the formula $$CH_3-(CH_2)_{14}-CH_2-O-CH_2-Cl$$

10. A salt of a product of the formula

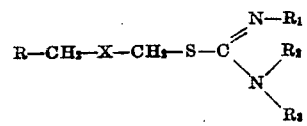

wherein $R-CH_2-$ stands for a member of the group consisting of alkyl radicals containing at least 16 carbon atoms and alkyl radicals containing at least 16 carbon atoms and having the carbon chain thereof interrupted by an

group, the carbon atom of the latter adhering to the $-CH_2-$ group of the said $R-CH_2-$, wherein X stands for a member of the group consisting of oxygen and sulfur, and wherein $R_1$, $R_2$ and $R_3$ are members of the group consisting of hydrogen and alkyl radicals.

11. A salt of a product of the formula

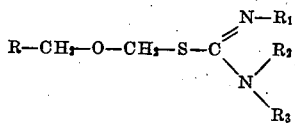

wherein R—CH$_2$— stands for a member of the group consisting of alkyl radicals containing at least 16 carbon atoms and alkyl radicals containing at least 16 carbon atoms and having the carbon chain thereof interrupted by an

group, the carbon atom of the latter adhering to the —CH$_2$—group of the said R—CH$_2$—, and wherein R$_1$, R$_2$ and R$_3$ are members of the group consisting of hydrogen and alkyl radicals.

12. A salt of a product of the formula

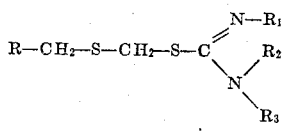

wherein R—CH$_2$— stands for a member of the group consisting of alkyl radicals containing at least 16 carbon atoms and alkyl radicals containing at least 16 carbon atoms and having the carbon chain thereof interrupted by an

group, the carbon atom of the latter adhering to the —CH$_2$— group of the said R—CH$_2$—, and wherein R$_1$, R$_2$ and R$_3$ are members of the group consisting of hydrogen and alkyl radicals.

13. A salt of a product of the formula

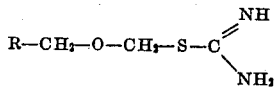

wherein R—CH$_2$— stands for a member of the group consisting of alkyl radicals containing at least 16 carbon atoms and alkyl radicals containing at least 16 carbon atoms and having the carbon chain thereof interrupted by an

group, the carbon atom of the latter adhering to the —CH$_2$— group of the said R—CH$_2$.

14. A salt of a product of the formula

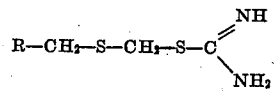

wherein R—CH$_2$— stands for a member of the group consisting of alkyl radicals containing at least 16 carbon atoms and alkyl radicals containing at least 16 carbon atoms and having the carbon chain thereof interrupted by an

group, the carbon atom of the latter adhering to the —CH$_2$— group of the said R—CH$_2$.

15. A salt of the product of the formula

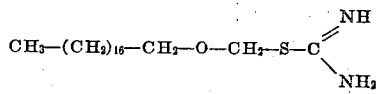

which salt is soluble in water to form a solution which is decomposed by boiling or by treating with alkalies, water-insoluble compounds being formed.

16. A salt of the product of the formula

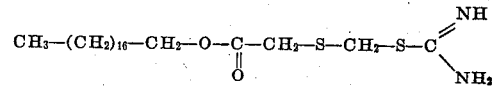

which salt is soluble in water to form a solution which is decomposed by boiling or by treating with alkalies, water-insoluble compounds being formed.

17. A salt of the product of the formula

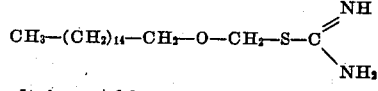

which salt is soluble in water to form a solution which is decomposed by boiling or by treating with alkalies, water-insoluble compounds being formed.

CHARLES GRAENACHER.
RICHARD SALLMANN.
OTTO ALBRECHT.